(12) United States Patent
Lloyd et al.

(10) Patent No.: US 8,290,610 B2
(45) Date of Patent: Oct. 16, 2012

(54) METHOD AND APPARATUS FOR MANUFACTURING AN ARTICLE AND GENERATING A REPORT

(75) Inventors: Robert Lloyd, Bristol (GB); Peter Lunt, Bristol (GB); Jeremy Cushen, Bristol (GB); Ashutosh Tiwari, Bristol (GB); Kostas Vergidis, Bristol (GB)

(73) Assignee: Airbus Operations Limited, Bristol (GB)

( * ) Notice: Subject to any disclaimer, the term of this patent is extended or adjusted under 35 U.S.C. 154(b) by 621 days.

(21) Appl. No.: 12/235,836

(22) Filed: Sep. 23, 2008

(65) Prior Publication Data
US 2009/0105864 A1    Apr. 23, 2009

(30) Foreign Application Priority Data
Oct. 18, 2007  (GB) .................... 0720438.1

(51) Int. Cl.
*G06F 19/00*    (2006.01)
(52) U.S. Cl. ......... 700/174; 700/108; 700/109; 702/185
(58) Field of Classification Search .......... 700/108–111, 700/174; 702/84, 108, 127, 185; 705/7.11, 705/7.14, 7.42
See application file for complete search history.

(56) References Cited

U.S. PATENT DOCUMENTS

| | | | |
|---|---|---|---|
| 5,189,624 A * | 2/1993 | Barlow et al. ............... | 700/169 |
| 5,880,965 A * | 3/1999 | Nakamura et al. ........... | 700/175 |
| 6,052,627 A * | 4/2000 | Nakamura ................... | 700/182 |
| 6,434,443 B1 | 8/2002 | Lin | |
| 6,512,961 B1 * | 1/2003 | Fukaya et al. ............... | 700/174 |
| 7,483,762 B2 * | 1/2009 | Muro et al. .................. | 700/108 |
| 7,571,019 B2 * | 8/2009 | Winstead et al. ............ | 700/100 |
| 7,720,559 B1 * | 5/2010 | Stewart ........................ | 700/121 |
| 2003/0154146 A1 | 8/2003 | Muro et al. | |

FOREIGN PATENT DOCUMENTS

JP    11066174    8/1997

OTHER PUBLICATIONS

Grauer, M., Karadgi, S., Muller, U., Metz, D., Schafer, W.: Proactive control of manufacturing processes using historical data. Lecture Notes in Computer Science 6277, 399{408 (2010).*
Dencker, K.; Stahre, J.; Grondahl, P.; Martensson, L.; Lundholm, T.; Johansson, C.; "An Approach to Proactive Assembly Systems: -Towards competitive assembly systems," Assembly and Manufacturing, 2007. ISAM '07. IEEE International Symposium on, vol., No., pp. 294-299, Jul. 22-25, 2007.*
UK Search Report for GB0720438.1 dated Feb. 18, 2008.

* cited by examiner

*Primary Examiner* — Dave Robertson
(74) *Attorney, Agent, or Firm* — Lowe, Hauptman, Ham & Berner, LLP

(57) ABSTRACT

The present disclosure discloses a method of manufacturing an article. According to at least one embodiment, a set of manufacturing instructions is stored for a machine, and at least one of the manufacturing instructions is imputed into the machine. In addition, an article is manufactured with the machine in accordance with the input manufacturing instructions, and a realisation log which is indicative of the operations that the machine has actually performed in manufacturing the article is generated. Further, a report by comparing the realisation log with the stored set of manufacturing instructions is generated.

19 Claims, 5 Drawing Sheets

| MSN: 12384 | Inspection Report for:<br>Missing Holes | User: 74125 |
| --- | --- | --- |
| PART No. 52415 | | |
| Type of Panel: LP2 | | Date: 30/03/2007 |

| Design Intent ID | PP_X | PP_Y | PP# | String | Fwd / Aft | Rib No | Position | Fastener Type | Diameter |
| --- | --- | --- | --- | --- | --- | --- | --- | --- | --- |
| TST26A22047BF06XBIM | 13824.9 | 17608.2 | 67382 | STR26 | Fwd | 22 | Rib | B | 06 |
| TST26A22054BA06XBIS | 13904 | 17612.8 | 67383 | STR26 | Fwd | 22 | Rib | B | 06 |
| TST26A22055BA06XBIM | 13857 | 17769.9 | 67383 | STR26 | Aft | 22 | Rib | B | 06 |

Figure 5

| MSN: 12365 | Inspection Report for:<br>Wrong Fasteners Length | User: 74125 |
| --- | --- | --- |
| PART No. 52415 | | |
| Type of Panel: LP2 | | Date: 30/03/2007 |

| ID | PP_Num | Block_Num | Commanded Fastener Length | Installed Fastener Length | Error in Fastener Length |
| --- | --- | --- | --- | --- | --- |
| BST21-A34XRTM | 67341 | 139 | 11 | 09 | |
| BST21-A34XRTM | 67341 | 1617 | 20 | 17 | |
| BST21-A34XRTM | 67341 | 1696 | 15 | 13 | |

Figure 6

METHOD AND APPARATUS FOR MANUFACTURING AN ARTICLE AND GENERATING A REPORT

RELATED APPLICATIONS

The present application is based on, and claims priority from, British Application Number 0720438.1, filed Oct. 18, 2007, the disclosure of which is hereby incorporated by reference herein in its entirety.

FIELD OF THE INVENTION

The present invention relates to a method and apparatus for manufacturing an article; and a method, apparatus and software for generating a report.

BACKGROUND OF THE INVENTION

Many manufacturing processes have become fully automated resulting in high production volumes. However, this is not the case for inspection. Rapid advances in machine tool technology have resulted in fast processing Computer Numerical Control (CNC) machines that are capable of manufacturing parts at high speeds, turning their manual inspection process into a bottleneck.

Inspection is necessary as the CNC machines may skip particular machine instructions, either as a result of an operator override mechanism or due to an automated checking mechanism that instructs the machine not to proceed with the given instruction. There is also the possibility that the machine may mishandle a particular machine instruction due to a fault in one or more of the CNC machine components.

Increasing levels of automation in manufacturing industry have not yet led to similar levels of automation in the inspection of intermediate and finished products. Therefore, it is a continuous challenge for Inspection Engineers to cope with the pace of high speed automatic CNC machines, to ensure inspection quality in comparable time frames. One solution has been the use of highly automated machines to carry out inspection such as robots, scanning or artificial visionary devices, but this is an expensive solution which is not always practical.

SUMMARY OF THE INVENTION

A first aspect of the invention provides a method of manufacturing an article, the method comprising:
a) storing a set of manufacturing instructions for a machine;
b) inputting at least some of the manufacturing instructions into the machine;
c) manufacturing an article with the machine in accordance with the input manufacturing instructions;
d) generating a realisation log which is indicative of the operations that the machine has actually performed in manufacturing the article; and
e) generating a report by comparing the realisation log with the stored set of manufacturing instructions.

The method enables inspection reports to be generated quickly and accurately without requiring any manual inspection of the article. Step d) and/or e) can be performed automatically by a suitably programmed computer, which may be an integral part of the machine.

A second aspect of the invention provides a method of generating a report for an article which has been manufactured by storing a set of manufacturing instructions for a machine; inputting at least some of the manufacturing instructions into the machine; manufacturing the article with the machine in accordance with the input manufacturing instructions; and generating a realisation log which is indicative of the operations that the machine has actually performed in manufacturing the article, the method comprising: generating the report by comparing the realisation log with the stored set of manufacturing instructions.

A third aspect of the invention provides apparatus configured to perform the method of the first or second aspect of the invention.

A fourth aspect of the invention provides a software tool configured to perform the method of the second aspect of the invention.

Various preferred features of the invention are described in the dependent claims.

BRIEF DESCRIPTION OF THE DRAWINGS

Embodiments of the invention will now be described with reference to the accompanying drawings, in which:
FIG. 5 is an inspection report for skipped operations (missing holes);
and
FIG. 6 is an inspection report for other types of errors (wrong fastener length).

DETAILED DESCRIPTION OF EMBODIMENT(S)

A preferred embodiment of the invention will now be described by way of example with reference to the manufacture of an aircraft wing. However it will be appreciated that the invention is applicable to the manufacture of any article.

Figure 1A:
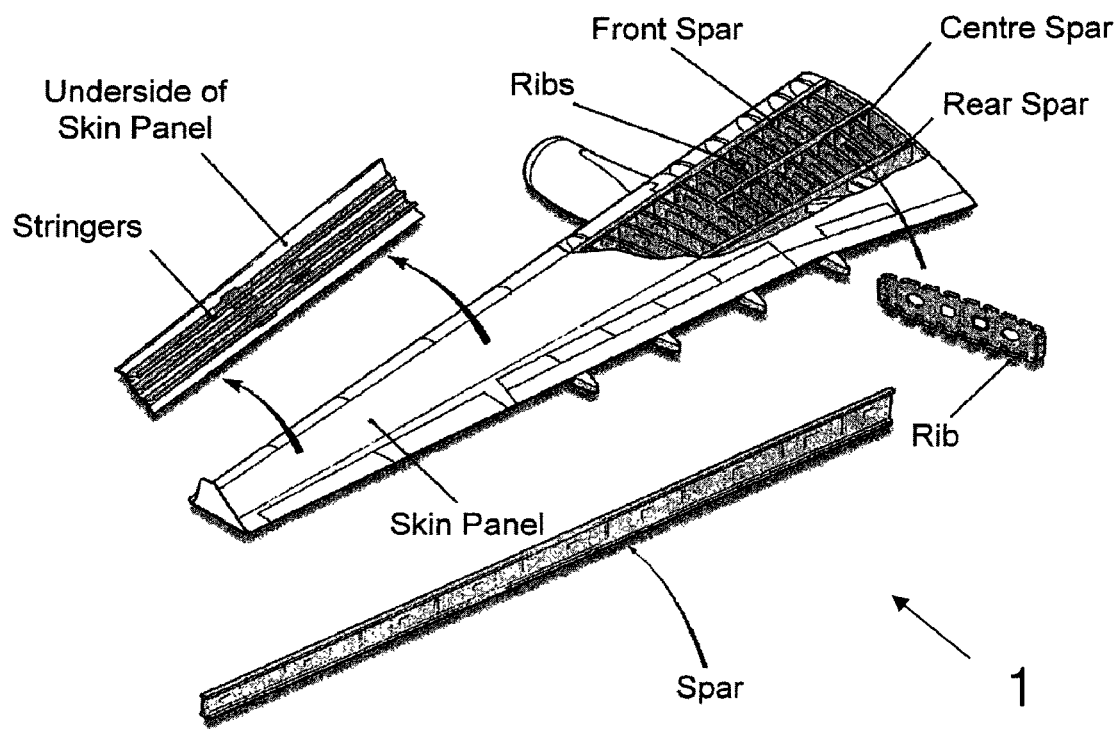
FIG. 1a shows the basic structure of an aircraft wing.
Figure 1B:
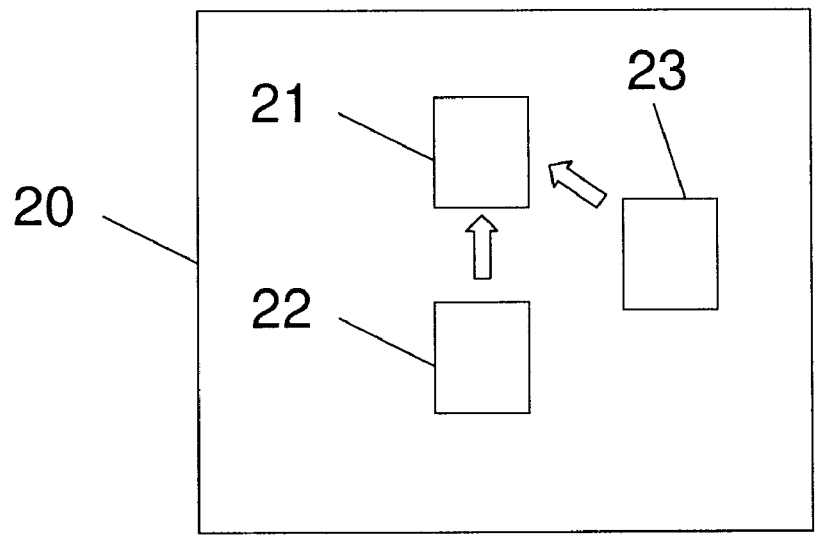
FIG. 1b is a schematic view of a CNC machine.

Aircraft wings are shaped by panels that provide the strength and structure to the wings. FIG. 1a demonstrates the basic structure of an aircraft wing 1. Each wing contains up to ten panels of different lengths and sizes. The manufacturing process for these panels involves drilling, riveting, bolting, cold working and fastening of around 26,000 holes on these panels. These operations are performed by an Electro-Impact CNC machine 20 shown in FIG. 1a working at high speeds.

The CNC machine 20 is controlled by a suitably programmed computer 21 which stores a set of manufacturing instructions. These instruction are validated by the manufacturing department of the aerospace manufacturer before they are stored on the computer 21. Each manufacturing instruction specifies a respective operation to be performed by the machine, and may specify certain parameters associated with that operation. Three examples of manufacturing instructions are as follows:
a) drill hole of length L1 in stack assembly at position (x,y,z), with a drill bit rotating at S rpm and oriented at an A/B angle of θ to the xy plane; or
b) insert fastener of length L2 into hole at position (x,y,z); or
c) strike fastener with tool by charging capacitor to voltage V, and discharging with current I.

The actual operations performed by the CNC machine may differ from the operations specified in the manufacturing instructions for a number of reasons.

A first reason is that the computer 21 includes a manual operator override mechanism which can be used at any time to cause the machine to skip or abort one or more operation. For instance an operator may notice that the drill bit is making a loud noise so may instruct the CNC machine, via an input device 22 such as a keyboard, to abort a drilling operation before the hole is drilled to length L1, or may instruct the CNC machine to skip the next drilling operation.

A second reason is that the computer 21 includes a certain amount of automatic intelligence which may cause it to skip or amend an operation. That is, the operation is skipped or amended as an automated response resulting from some automated checking mechanism carried out before executing the operation. Take for instance manufacturing instruction a) specified above. The CNC machine includes a sensor 23 which determines the thickness of the stack assembly at the position (x,y,z) specified by instruction a). If the measured thickness is too great or small, then the CNC machine may automatically drill a hole of a more appropriate length (L1+$\delta$, or L1-$\delta$), and then insert a fastener of a similarly adjusted length (L2+$\delta$, or L2-$\delta$).

A third reason is that at least one machine component may be faulty. For instance the capacitor may be faulty, so the CNC machine is unable to achieve the voltage V and/or current I specified by instruction c).

The machine records all of the operations actually performed in the form of realisation logs that are continuously generated for each panel.

As the machines are working uninterrupted, the realisation logs are generated during execution. These logs not only record the operations performed by the machine but also store information about a range of parameters related to the operation (e.g. precision achieved, voltages, etc.). One machine can work upon different panels in a sequence, and one panel can pass through different machines before it is finalised. A key challenge is to extract the information regarding the operations performed on a single panel from the logs of various machines that operate continuously on different panels.

Conventional inspection processes involve the manual inspection of each manufactured wing panel for two main types of errors: (i) missing holes and (ii) missing fasteners. Manual inspection can be very time consuming with inspection duration for a wing set up to 120 hours. This is due to the fact that the inspectors check one by one all the holes and fasteners in every single wing panel in order to locate any missing operations or damage. This results in inspection being the bottleneck of a fast manufacturing process along with the quality issues. What is needed is to automate the inspection process by automatically locating the erroneous operations based on predefined criteria. This not only tackles the long inspection times but can also ensure that all erroneous operations are located in a consistent and trustworthy fashion. The next section discusses a proposed approach in order to address the issues that arise in manual inspection. There would still remain a requirement to manually inspect, however at a dramatically reduced level, to check for damage but correlation of installed fasteners to design intent would no longer be required post First Article Inspection Report (FAIR). The first part must be checked against design intent for proof of concept and validation of NC data.

Proposed Inspection Approach

This section describes an approach for the automation of the inspection process. This approach consists of two main steps: (i) the development of an algorithm that automates the inspection process using data from the manufacturing operations; and (ii) the implementation of this algorithm in software that suits the requirements of the inspection engineers and contributes to improving the inspection process by reducing the time needed to inspect a panel and increasing the quality and consistency of the inspection results.

The Comparison Algorithm

Figure 2:
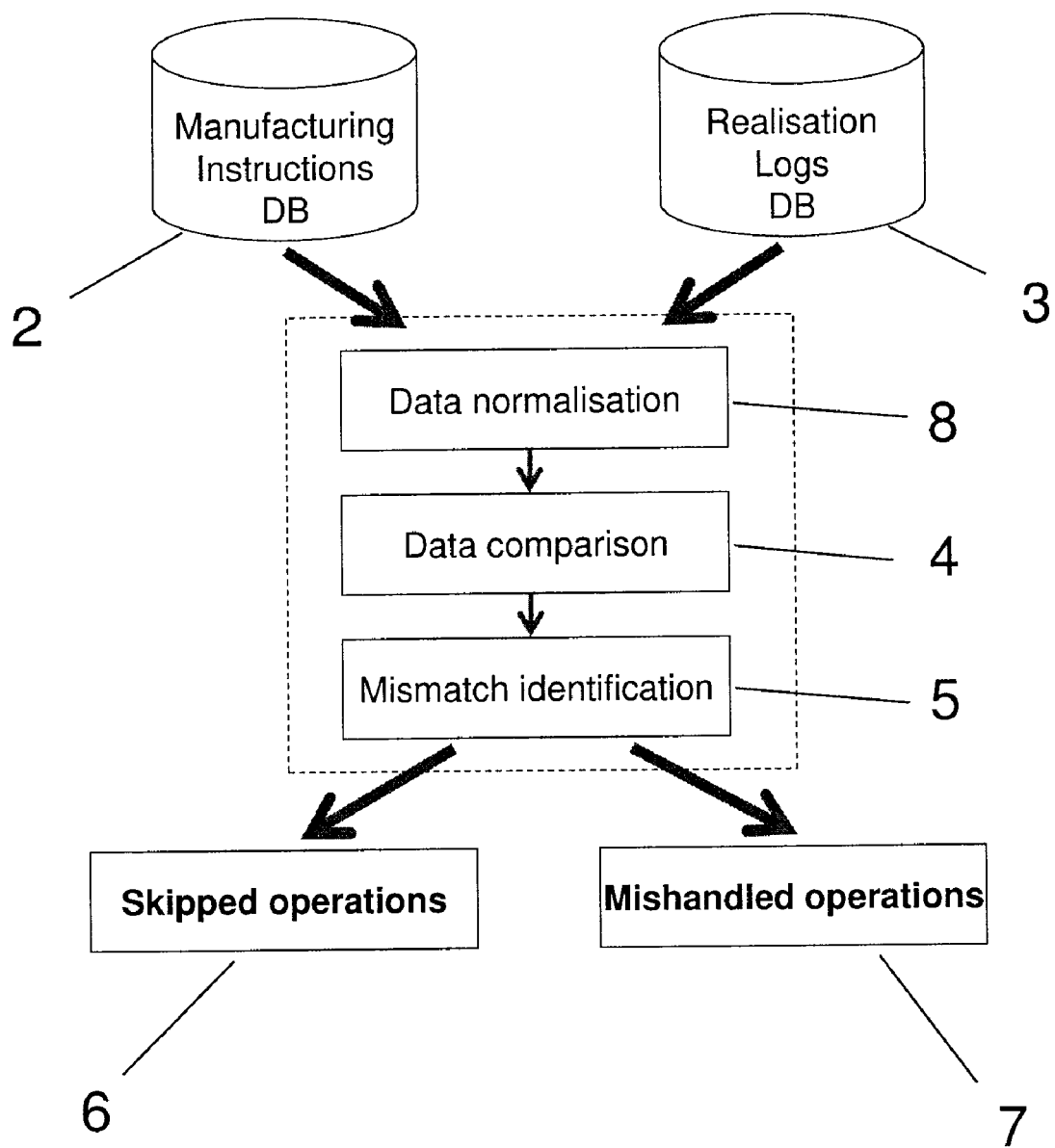
FIG. 2 shows the main steps of database comparison for identifying erroneous operations.

The proposed approach illustrated in FIG. 2 utilises the data from two different databases. The first database 2 is named Manufacturing Instructions Db (MIDb) and it contains the data that are used as inputs for the CNC machines. It contains the instructions for all the operations that the machine is expected to perform. The second database 3 is called Realisation Logs Db (RLDb) and it contains the output (log) of the machines. It records the data about the operations that the machine has actually performed. The proposed approach is based on the concept that by comparing in step 4 the input (instructed operations) and the output (performed operations) of the machines, the operations that were mishandled or omitted can be identified in a timely fashion.

This can be realised by comparing the data stored in these two databases 2, 3. Any difference in the data recorded in these two databases is recorded in step 5 as an error. Two types of errors are of interest: (a) skipped operations 6, i.e. manufacturing operations that the machine did not perform and (b) mishandled operations 7, i.e. manufacturing operations that the machine performed but not as instructed or were incomplete. In the first case of errors, the operation details are stored in the MIDb 2 but they are not recorded in the RLDb 3. In the second case, the operation details are stored in both databases but in the RLDb 3 some information is altered based on how the operation was actually performed. It important to note that the MIDb 2 is 100% reliable as it contains the validated manufacturing instructions for all the operations of the CNC machines. These instructions are validated by the manufacturing department of the aerospace manufacturer before they are sent to the CNC machines confirmed by FAIR. Also, the output of the CNC machines is considered fully reliable as the machines accurately record each operation that they perform on the panel. This is confirmed by the machine manufacturer in the machine manual.

FIG. 2 demonstrates the main steps in the comparison. These steps may be performed by the CNC computer 21, or by any other computer programmed with an appropriate software tool. The main inputs for the comparison are the data stored in each of the two databases 2, 3. Before the actual comparison the data contained in the databases needs to be normalised in step 8. This is due to the fact that CNC machines produce the logs in the form of text files. These text files in the RLDb 3 need to be re-structured following the schema (field names, tables, etc.) of the MIDb 2 so that direct comparison can take place. Comparing the databases and identifying any discrepancies results in two types of errors discussed previously: skipped and mishandled operations. A list of these types of errors is compiled in an inspection report that provides a coherent reference of the operations that were either omitted or performed in an inaccurate fashion.

Figure 3:
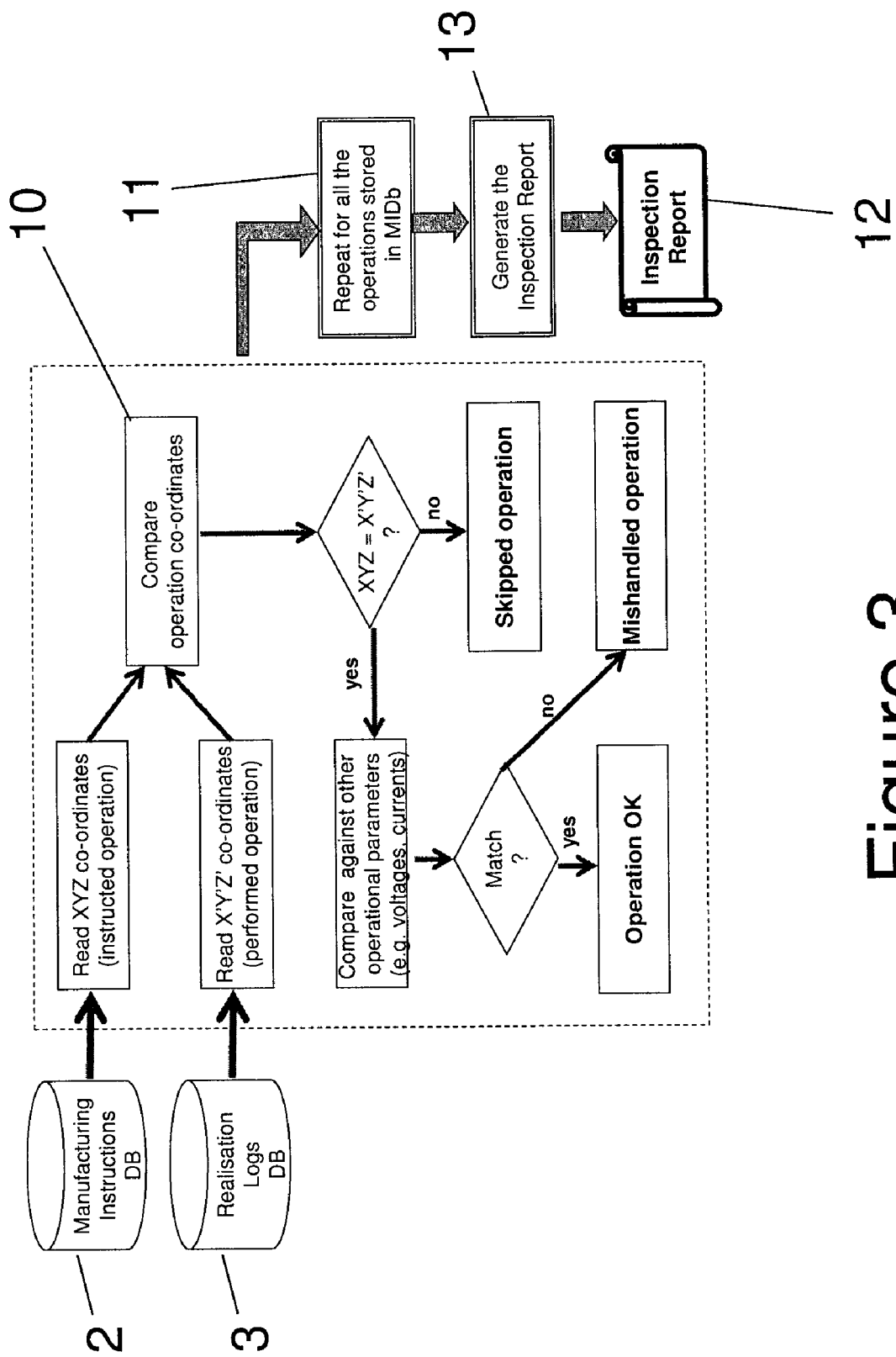
FIG. 3 shows the generation of the Inspection Report by the comparison algorithm.

FIG. 3 presents a more detailed view of the approach by demonstrating in a flowchart the main steps of the comparison algorithm shown in FIG. 2. Once the databases are in the same format, each operation goes through the comparison algorithm. The aim of the algorithm is to compare the manufacturing operations as they are recorded and stored in the two databases and identify the erroneous ones. The fundamental criteria for comparison are the x,y,z co-ordinates of an operation. In addition to these, dynamic quantities such as voltage, current, spindle speed or feed, spindle position, A/B axis angle can be used as criteria for error detection. These two categories of criteria are essential in order to identify the operations that are skipped and incorrectly performed by the CNC machines.

As shown in FIG. 3, the comparison algorithm uses as inputs the data stored in the MIDb 2 about the operation instructions and the data recorded in RLDb 3 regarding the operations performed. The steps in the dotted box occur for every operation that is stored in MIDb 2. At first, each operation is evaluated in step 10 based on its instructed coordinates (XYZ) and its recorded coordinates (X'Y'Z'). The instructed coordinates originate from the MIDb 2 and the recorded coordinates from the RLDb 3 as these are the outputs of the CNC machines. If an operation from the MIDb 2 with XYZ coordinates does not have a corresponding match in the RLDb 3, then the operation is considered as skipped. In order to separate skipped from mishandled operations, there is a predefined tolerance level. If an operation is performed within this level, it is considered as mishandled, whereas if it is outside this level it is considered as skipped. Mishandled operations are identified by comparisons using other criteria such as voltages, stack value, fastener length and currents. If these criteria match in terms of instructed and performed details then the operation is considered successful.

This process is repeated (see step 11) for all the operations stored in the Manufacturing Instructions database 2. Once this process is completed an Inspection Report 12 is automatically generated in step 13. This report contains all the operations that the algorithm has flagged as erroneous. Each operation is listed as skipped or mishandled. In the case of mishandled operations, further details about the error are provided (e.g. the criteria that fell outside acceptable tolerances). The generation of this report 12 can contribute to determining the quality of a manufacturing process in an accurate and timely fashion while reducing the necessity for manual inspection of each operation performed.

Development of an Automated Inspection Tool

The second step of the approach for the automation of the inspection process involves the implementation of a software application based on the comparison algorithm described in the previous section. The application normalises and compares the data from the MIDb and RLDb, and generates a variety of customised Inspection Reports 12 in an automated manner. The scope of the application is to automate the inspection for a range of wing panels. The main steps for the implementation of the inspection tool involve:
1. Investigation of the structure and form of the data required.
2. Transforming noisy and redundant data into useful information.
3. Designing the schemas of the two databases in order to utilise data normalisation and direct comparison.
4. Extracting information for a specific panel from different data sources.
5. Development of the comparison algorithm to compare the panel information contained in the two databases.
6. Implementation of the above functionalities with a simple user interface.
7. Presentation of the results.

The software tool is developed in Microsoft Access utilising Visual Basic elements (such as forms, macros, etc.) and SQL queries in order to generate the automatic inspection reports 12. The queries contribute to locating and comparing relevant data from the databases and the Visual Basic elements help in creating a user-friendly interface. The enormity and complexity of databases pose a challenge for the normalisation process as each of the databases contains on average more than 200,000 records. The databases are in different formats without clear structure containing fragmented information. The Manufacturing Instructions in their initial form come in textual or Microsoft Excel format and Realisation Logs come in textual form. The normalisation step 8 involves the import and conversion of these two formats to the corresponding databases in Microsoft Access.

Figure 4:
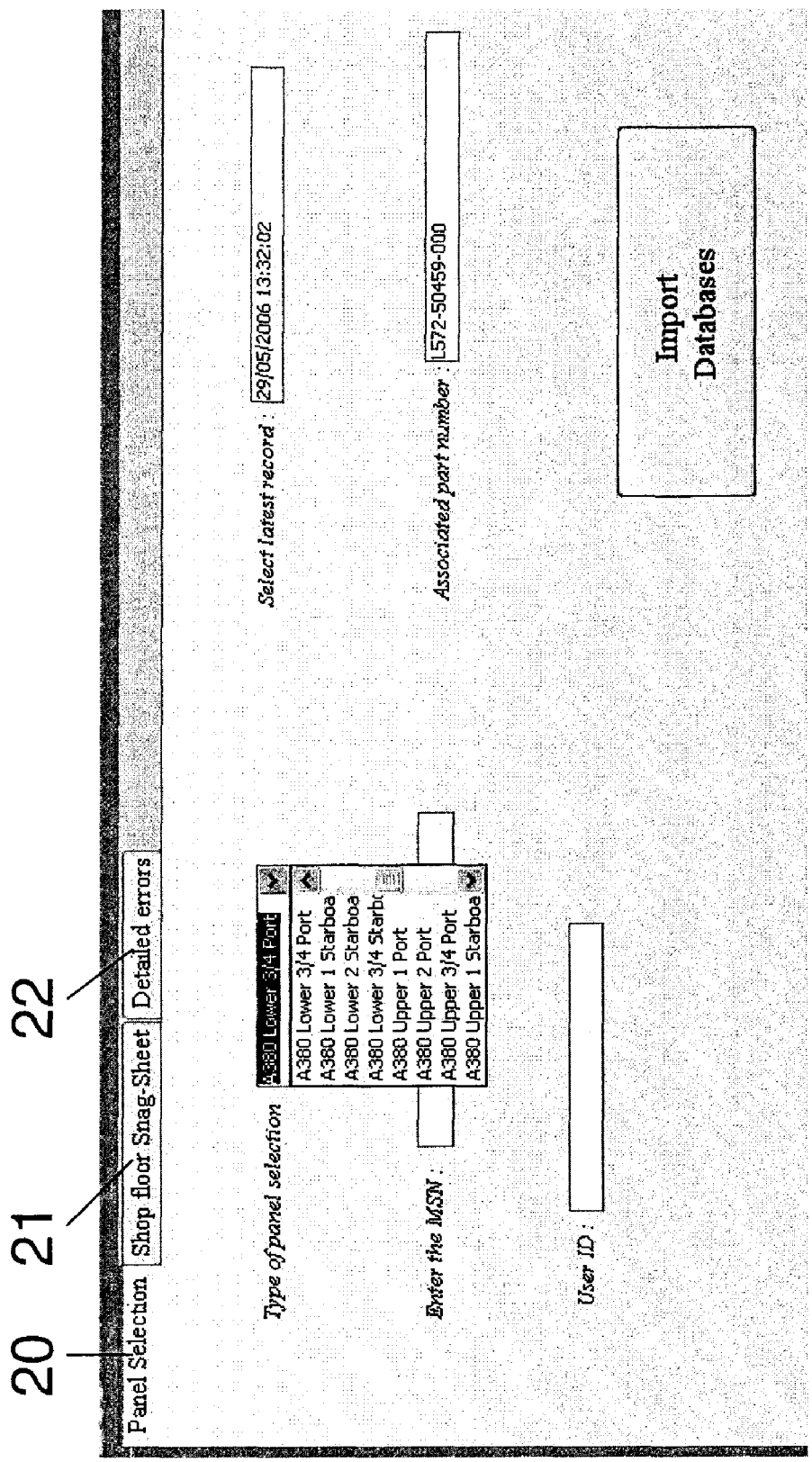
FIG. 4 is a snapshot of the user interface.

A snapshot of the application's user interface is shown in FIG. 4. The application consists of a series of tabs. These tabs are:
1. Panel selection tab 20, which provides the opportunity to select a part—a panel in this case—and start the automatic inspection process. This is challenging because one machine works upon different panels and one panel goes to different machines before it is finalised. When a specific panel is selected, the software imports all the data about that panel and converts them into the correct format. As the user selects a panel, the associated part number assigned for its identification is selected automatically. The default setting is the selection of the last machined panel. Once the required panel is selected and all the fields are completed, the data can be imported and normalised. Using literal descriptions of the product in the GUI as shown in FIG. 4 and automatically linking them to the relevant part number via an association table assists in shop-floor comprehension and acceptance
2. Shop floor Snag-sheet tab 21, which provides options for a customised generation of the Inspection Report for skipped operations. 'Snag sheet' is what inspection reports are called within the particular aerospace context. As discussed earlier, the identification of skipped operations is carried out by matching the coordinates of each operation recorded in the MIDb with the data in the RLDb. Options are provided to generate reports for missing holes and/or missing fasteners—the two main time consuming activities when inspected manually.
3. Detailed errors tab 22, which provides a list of other types of errors (i.e. mishandled operations) to be included in the Inspection Report. This tab provides the opportunity of selecting an additional and more specific type of error. Examples of manufacturing parameters that could be analysed for detecting possible errors are voltages, stack value, incorrect fastener length and cold work. As discussed earlier, these errors are detected by matching the relevant parameters of the operations stored in the MIDb 2 with those recorded in RLDb 3. The output of any of such comparisons can be visualised in the form of an Inspection Report.

FIGS. 5 and 6 present instances of such Inspection Reports. FIG. 5 demonstrates a list of missing holes (skipped operations) for a specific panel. Each hole is identified by a unique ID that was allocated during the design stage of the panel. For each hole that has been identified as missed, further information is provided such as coordinates, rib number, position, fastener type and diameter to assist in physical location and rectification of the fault. FIG. 6 demonstrates an Inspection Report for wrong fastener length (specific type of mishandled operation) for a panel. Again for the operations that have been identified as erroneous based on the specific criterion, detailed information is provided.

Comparison of Manual vs. Automated Inspection

This section presents the effects of the proposed approach to the inspection process in terms of time and quality improvements. It compares the proposed automated inspection approach with the manual inspection practice that is currently followed within a large aerospace manufacturer. Table 1 describes the basic elements of the inspection process when performed manually and when it follows the automated approach that this paper proposes.

Table 1 shows how the current manual practice of inspection can be improved by the proposed software-assisted approach. In the manual approach the most time-consuming steps are 6 and 7 where the Inspection Engineers have to manually inspect every single operation performed on each wing panel and record deviances on an inspection report. This approach also raises issues about the quality of inspection performed i.e. the consistency of report formats and textual information contained therein. The automated approach aims at incorporating the software tool as part of the inspection process in order to partly automate it and reduce the need for manual inspection of the operations performed. However, the automated approach only checks for skipped or mishandled operations performed by the machine. It does not check for other defects, such as those arising due to transportation, fixtures, etc. This means that visual inspection is not eliminated but it is greatly reduced since the manual inspection of the operations performed by the CNC machines is no longer required.

TABLE 1

Comparison of manual vs. automated inspection process

| no. | Manual inspection | Automated inspection |
|---|---|---|
| 1 | Design Instructions are passed to Manufacturing department. | |
| 2 | Generation of Manufacturing Instructions in the form of NC codes. | |
| 3 | NC codes fed to the CNC machines. | |
| 4 | CNC machines perform the operations and record them in the Realisation Logs. | |
| 5 | Realisation Logs not further utilised. | Realisation Logs are normalised and fed to the comparison algorithm. |
| 6 | Shop floor inspectors inspect the panels manually, in association with drawings, to identify the skipped operations. | Manufacturing Instructions are normalised and compared with Realisation Logs to identify skipped or mishandled operations. |
| 7 | Inspection Engineers record the errors manually in reports. | Inspection Reports are generated automatically by the software tool. |
| 8 | The reports are returned to Manufacturing department for undertaking corrective steps. | Rework tasks that are possible on CNC machines are completed immediately. |
| 9 | Decision is made on operation-by-operation basis on whether the rework will be performed manually or by CNC machines. Rectification is generally via manual means as, due to the inherent time taken to perform the insp. operation, inspection is completed away from the m/c in order to free the facility for further production. Manually installed fasteners are usually "alternatives" that require concessionary reporting | Remaining rework is undertaken manually. |
| 10 | Time consuming repeated backward loops of rework. | Reduction in backward loops of rework. |

In order to demonstrate the time efficiency of the proposed automated inspection, it was incorporated in the inspection process of wing panels for three different aircraft models (A, B and C). The difference between these models is in the quantity of data and the number of operations performed in their wing panels. Testing the tool with different inspection requirements can provide a good indication of the effect it can have on the inspection process. The duration of the inspection process with the tool was measured and compared with the duration of the manual inspection process. The results obtained demonstrate that the software tool provides a drastic reduction in the time required to inspect the panels.

Table 2 demonstrates the results for the aircraft model A. The manual inspection takes up to 120 hours without the capability for checking other types of quality errors. The proposed approach is capable of producing the Inspection Reports in 6 hours, performing not only the missed operation inspection, but also more quality checks, in 5% of original time. The results for aircraft model B in table 3 concern a wing set smaller than A. Again there is a 95% reduction in the duration of the inspection process. The manual approach takes 60 hours per wing set as opposed to 3 hours for the automated approach. The aircraft model C contains the smallest wing set that requires an 18-hour manual inspection. The automated approach requires less than an hour, providing a 94% reduction in the inspection time required. It is important to note that the data for each model of aircraft were provided in different formats. The software tool was able to import and normalise the data as it supports inputs in a variety of formats (.txt, .db, .xls, etc).

TABLE 2

Manual vs. Software-assisted inspection for aircraft model A

| no. | Inspection & Report compilation of: | Manual inspection (hours) | Software-assisted inspection (hours) |
|---|---|---|---|
| 1 | Missing holes | 60 | 2 |
| 2 | Missing fasteners | 30 | 0.5 |
| 3 | Mishandled operations | 30 | 0.5 |
| 4 | Other types of errors | — | 3 |
| | TOTAL DURATION: (for a wing set) | 120 | 6 |

TABLE 3

Manual vs. Software-assisted inspection for aircraft model B

| no. | Inspection & Report compilation of: | Manual inspection (hours) | Software-assisted inspection (hours) |
|---|---|---|---|
| 1 | Missing holes | 30 | 1 |
| 2 | Missing fasteners | 15 | 0.25 |
| 3 | Mishandled operations | 15 | 0.25 |
| 4 | Other types of errors | — | 1.5 |
| | TOTAL DURATION: (for a wing set) | 60 | 3 |

TABLE 4

Manual vs. Software-assisted inspection for aircraft model C

| no. | Inspection & Report compilation of: | Manual inspection (hours) | Software-assisted inspection (hours) |
|---|---|---|---|
| 1 | Missing holes | 9 | 0.3 |
| 2 | Missing fasteners | 4.5 | 0.08 |
| 3 | Mishandled operations | 4.5 | 0.08 |
| 4 | Other types of errors | — | 0.4 |
| | TOTAL DURATION: (for a wing set) | 18 | <1 |

The proposed automated inspection approach generates the reports automatically with no human intervention. The accuracy of the manually produced reports during the first inspection can be estimated to be around 99.9%. As each panel has 26,000 holes the estimated error in reporting is 26 operations per panel. The inspection operation is performed a second time, following rectification of the original faults, thus 100% accuracy is guaranteed at the expense of time. The automated inspection approach is reported to have 100% accuracy identifying correctly all the operations that fall in the category of skipped or mishandled; also eliminating the need for a second round of manual inspection. Therefore, the inspection reports with the proposed automated approach are more accurate, reliable and efficient in terms of time.

Also the presentation of the report is improved making the reports easy to read and understand. Each Inspection Report is tailored for different kinds of errors providing the most suitable information in each case. The information that appears in each report is decided in conjunction with Inspection Engineers and their requirements. An important advantage of the automated approach is that it can be used at run time with the machines. As the Realisation Logs are generated, they are normalised and compared with the Manufacturing Instructions in order to determine the quality of the operations performed.

The outcome of the software tool can be compared with the results from the relevant manual inspection process. The results have been found to be more accurate than those from the relevant manual inspection processes due to the removal of human errors. The accuracy and reliability of both the inputs (manufacturing instructions and realisation logs) were also validated. However, as demonstrated by the results, the software-assisted inspection was performed in a considerably reduced time.

Discussion

The benefits of the automated approach, as highlighted by the comparison with the manual inspection practice, are twofold: (i) the drastic reduction in the inspection duration and (ii) increased reliability and confidence in the quality of the inspection results. The reduction in inspection duration implies the removal of routine and tedious manual inspection of every single manufacturing operation by exploiting the output of the CNC machines. The proposed approach can be applied to any manufacturing process. Essentially, if a manufacturing process has a stored input and output that can be normalised and compared, then the proposed approach can be applied.

The inspection tool can be executed in real-time while a part is manufactured. This will provide the capability of detecting errors as they occur, thus the decision making process of rework can be shortened and made more effective. Also, the proposed approach could be further supported by soft computing techniques and modern information system methods in order to develop knowledge-based decision support systems. Soft computing techniques exploit the tolerance for uncertainty and approximate reasoning for making decisions in real-life ambiguous environments. Intelligent analysis of the parameters could be carried out to avoid errors. The decisions about whether the rework has to be done manually or by a machine could also be taken by these intelligent techniques. The manual inspection for detecting physical errors such as bends, breaks etc. could also be carried out by monitoring the parameters. When the tool breaks or damages the part, the parameters change abruptly and this is shown in realisation logs. Those specific operations or part of an operation that have a sudden change of parameters could also be identified by the proposed approach in the Inspection Report. Also, the potential of drilling into historical data to locate consistent or repeated problems is appealing using the proposed approach. That is, the software can generates multiple reports each associated with a respective part, and then generate a historical report by comparing the multiple reports to locate consistent or repeated problems. Finally, the proposed philosophy could be extended to other parts and industries that use modern CNC machines in manufacturing and assembly.

CONCLUSIONS

The preferred embodiment of the invention described above provides a novel approach for automating the inspection process of a manufactured part by utilising the data available. This data is stored in two main databases: the Manufacturing Instructions, which contain the operations instructed to the machines and the Realisation Logs, which contain the operations performed by the machines. The comparison of these two databases helps in identifying any skipped or mishandled operations. The proposed approach for automated inspection was compared with the manual practice and the results indicate a strong reduction in inspection lead-time for a part. Moreover, the inspection reports are more reliable and accurate in terms of quality output. The proposed approach also reduces manual rework, improves CNC machine utilisation and identifies errors that are difficult to be detected manually.

Although the invention has been described above with reference to one or more preferred embodiments, it will be appreciated that various changes or modifications may be made without departing from the scope of the invention as defined in the appended claims.

The invention claimed is:

1. A method of manufacturing an article, the method comprising:
   a. storing a set of manufacturing instructions for a machine;
   b. inputting at least some of the manufacturing instructions into the machine;
   c. manufacturing an article with the machine in accordance with the input manufacturing instructions;
   d. generating a realisation log which is indicative of the operations that the machine has actually performed in manufacturing the article wherein the realization log is generated by the machine recording each operation that it performs on the article including operations which differ from operations specified in the manufacturing instructions and operations in accordance with the operations specified in the manufacturing instructions, and wherein the realization log is generated by the machine without any inspection of the article; and
   e. generating a report by comparing the realisation log with the stored set of manufacturing instructions comprising
   comparing an operation in the realisation log with an associated manufacturing instruction;
   determining on the basis of the comparison whether the operation falls within a predefined tolerance level;
   categorising the operation in the report as mishandled if it falls within this level; and
   categorising the operation in the report as omitted if it falls outside this level.

2. The method of claim 1, wherein
   at least some of the manufacturing instructions specify a respective operation to be performed by the machine in manufacturing the article, and wherein
   the report indicates operations specified in the stored set which are omitted in the realisation log.

3. The method of claim 1 wherein
   at least some of the manufacturing instructions specify a parameter of an operation to be performed by the machine in manufacturing the article, and wherein the report indicates parameters specified in the stored set which are not matched in the realisation log.

4. The method of claim 3 wherein the parameter specifies a location of the operation.

5. The method of claim 3 wherein the parameter specifies a dynamic quantity including voltage, current, speed, frequency or force.

6. The method of claim 1 wherein steps c. and d. are performed at least partially simultaneously.

7. The method of claim 1 wherein steps c., d. and e. are performed at least partially simultaneously.

8. The method of claim 1 further comprising converting the format of the manufacturing instructions and/or the realisation log to enable the comparison in step e.

9. The method of claim 8 wherein the manufacturing instructions and the realisation log are both converted into a common structured database format.

10. The method of claim 1 wherein differences between the realisation log and the stored set of manufacturing instructions are caused by the activation of an operator override mechanism.

11. The method of claim 1 wherein differences between the realisation log and the stored set of manufacturing instructions are caused by an automated response of the machine to the result of an automated checking mechanism carried out before executing the operation.

12. The method of claim 1 wherein differences between the realisation log and the stored set of manufacturing instructions are caused by a fault in at least one machine component.

13. The method of claim 1 further comprising:
f) manufacturing one or more additional articles with the machine in accordance with the input manufacturing instructions;
g) generating one or more additional realisation logs, each indicative of the operations that the machine has actually performed in manufacturing a respective one of the additional articles;
h) generating one or more additional reports by comparing each additional realisation log with the stored set of manufacturing instructions; and
i) generating a historical report by comparing the reports to locate consistent or repeated problems.

14. The method according to claim 1, wherein
at least one of the manufacturing instructions specifies a parameter of an operation to be performed by the machine in manufacturing the article;
the report indicates at least one amended parameter specified in the stored set which are not matched in the realisation log; and
the at least one amended parameter is generated by the machine as an automated response resulting from an automated checking mechanism carried out by the machine before executing the operation;
wherein
the automated checking mechanism comprises:
measuring the article with a sensor before executing the operation; and
amending a parameter of the operation if the measurement of the article falls outside a desired tolerance.

15. A method of generating a report for an article which has been manufactured by storing a set of manufacturing instructions for a machine; inputting at least some of the manufacturing instructions into the machine; manufacturing the article with the machine in accordance with the input manufacturing instructions; and generating a realisation log which is indicative of the operations that the machine has actually performed in manufacturing the article wherein the realisation log is generated by the machine recording each operation that it performs on the article including operations which differ from operations specified in the manufacturing instructions and operations in accordance with the operations specified in the manufacturing instructions, and wherein the realisation log is generated by the machine without any inspection of the article, the method comprising:
generating the report by comparing the realisation log with the stored set of manufacturing instructions comprising
comparing an operation in the realisation log with an associated manufacturing instruction:
determining on the basis of the comparison whether the operation falls within a predefined tolerance level;
categorising the operation in the report as mishandled if it falls within this level; and
categorising the operation in the report as omitted if it falls outside this level;
generating one or more additional reports by comparing one or more additional realisation logs with the stored set of manufacturing instructions, each additional realisation log being associated with a respective different article; and
generating a historical report by comparing the reports to locate consistent or repeated problems.

16. An apparatus including a computer having a processor configured to perform stored computer-implemented instructions executing a method of manufacturing an article, the method comprising:
a. storing a set of manufacturing instructions for a machine;
b. inputting at least some of the manufacturing instructions into the machine;
c. manufacturing an article with the machine in accordance with the input manufacturing instructions;
d. generating a realisation log which is indicative of the operations that the machine has actually performed in manufacturing the article wherein the realization log is generated by the machine recording each operation that it performs on the article including operations which differ from operations specified in the manufacturing instructions and operations in accordance with the operations specified in the manufacturing instructions, and the realization log is generated by the machine without any inspection of the article; and
e. generating a report by comparing the realisation log with the stored set of manufacturing instructions comprising
comparing an operation in the realisation log with an associated manufacturing instruction;
determining on the basis of the comparison whether the operation falls within a predefined tolerance level;
categorising the operation in the report as mishandled if it falls within this level; and
categorising the operation in the report as omitted if it falls outside this level.

17. A computer program product having computer executable instructions embodied thereon that, when executed, perform a method of generating a report for an article which has been manufactured by storing a set of manufacturing instructions for a machine; inputting at least one of the manufacturing instructions into the machine; and manufacturing the article with the machine in accordance with the input manufacturing instructions, the method comprising:
generating a realisation log which is indicative of all the operations that the machine has actually performed in manufacturing the article, including operations which differ from operations specified in the manufacturing instructions and operations in accordance with the operations specified in the manufacturing instructions and wherein the realisation log is generated by the machine without any inspection of the article, comparing an operation in the realisation log with an associated manufacturing instruction;

determining on the basis of the comparison whether the operation falls within a predefined tolerance level;

categorising the operation in the report as mishandled if it falls within this level; and categorising the operation in the report as skipped if it falls outside this level.

18. The computer program product according to claim 17, the method further comprising:

converting the format of the manufacturing instructions and/or the realisation log to enable the comparison.

19. A method of manufacturing an article, the method comprising:

storing a set of manufacturing instructions for a machine;

inputting at least one of the manufacturing instruction into the machine;

manufacturing an article with the machine in accordance with the at least one input manufacturing instruction;

generating a realisation log which is indicative of the operations that the machine has actually performed in manufacturing the article wherein the realisation log is generated by the machine recording each operation that it performs on the article including operations which differ from operations specified in the manufacturing instructions and operations in accordance with the operations specified in the manufacturing instructions, and wherein the realisation log is generated by the machine without any inspection of the article; and generating a report by comparing the realisation log with the stored set of manufacturing instructions comprising comparing an operation in the realisation log with an associated manufacturing instruction:

determining on the basis of the comparison whether the operation falls within a predefined tolerance level;

categorising the operation in the report as mishandled if it falls within this level; and categorising the operation in the report as skipped if it falls outside this level, wherein at least one of the manufacturing instructions specifies a parameter of an operation to be performed by the machine in manufacturing the article;

the report indicates at least one amended parameter specified in the stored set which are not matched in the realisation log;

the at least one amended parameter is generated by the machine as an automated response resulting from an automated checking mechanism carried out by the machine before executing the operation; and the automated checking mechanism comprises measuring the article with a sensor before executing the operation and amending a parameter of the operation if the measurement of the article falls outside a desired tolerance.

* * * * *